(12) United States Patent
Daniels et al.

(10) Patent No.: US 6,700,359 B2
(45) Date of Patent: Mar. 2, 2004

(54) METHOD FOR SIMULTANEOUS OUTPUT RAMP UP OF MULTIPLE REGULATORS

(75) Inventors: David G. Daniels, Dallas, TX (US); Tom Fowler, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/952,865

(22) Filed: Sep. 12, 2001

(65) Prior Publication Data
US 2003/0048003 A1 Mar. 13, 2003

(51) Int. Cl.$^7$ ................................................ G05F 1/40
(52) U.S. Cl. ...................................................... 323/268
(58) Field of Search ........................ 323/266, 268–272, 323/282, 285, 288

(56) References Cited

U.S. PATENT DOCUMENTS

| | | | | |
|---|---|---|---|---|
| 4,581,690 A | * | 4/1986 | Russell | 363/17 |
| 5,661,643 A | * | 8/1997 | Blakely et al. | 363/21 |
| 6,157,550 A | * | 12/2000 | Otake | 363/21 |
| 6,316,970 B1 | * | 11/2001 | Hebert | 327/67 |
| 6,342,737 B1 | * | 1/2002 | Brodeur | 307/87 |

* cited by examiner

*Primary Examiner*—Matthew V. Nguyen
(74) *Attorney, Agent, or Firm*—W. Daniel Swayze, Jr.; W. James Brady; Frederick J. Telecky, Jr.

(57) ABSTRACT

An apparatus for generating a supply voltage includes a first regulator for generating a first supply voltage, a second regulator for generating a second supply voltage, and a feedback circuit to control the second regulator.

11 Claims, 4 Drawing Sheets

METHOD FOR SIMULTANEOUS OUTPUT RAMP UP OF MULTIPLE REGULATORS

FIELD OF THE INVENTION

The present invention relates to control of voltage regulators.

BACKGROUND OF THE INVENTION

The function of a voltage regulator is to provide a constant output voltage level even if the input voltage is poorly specified and fluctuating. Typically, the output of the voltage regulator is used as a supply voltage for other circuits in the system. As a consequence, the fluctuations and random variations in the supply voltage under changing load conditions are essentially eliminated.

Since the regulation and control of supply voltage is one of the most fundamental and critical requirements of the electronic system design, the monolithic voltage regulator or power control circuits have become some of the essential building blocks of any analog or digital system.

Today, there are two very distinctly different types of IC voltage regulators which have gained wide acceptance and popularity. These are series regulators and switching regulators. The series regulators control the output voltage by controlling the voltage drop across a power transistor which is connected in series with the load. The power transistor operates in its linear region and conducts current continuously. The switching regulator, on the other hand, controls the flow of power to a load by turning on and off one or more of the power switches connected in parallel or series with a load and make use primarily of inductive energy elements to convert the switch current pulses into a continuous and regulated load current.

In digital signal processor (DSP) systems, dual voltage power supply architectures are becoming more common place. Typically, to save power and to increase processing speeds, processing cores have smaller geometry cells and require lower supply voltages than system bus voltages. Consequently, power management in these types of systems is important.

In dual or multiple voltage architectures, coordinated management of power supplies is important to avoid potential problems and insure reliable performance. Timing and voltage differences must be considered between core and I/O voltage supplies during power up and power down operations. Sequencing the power supply refers to the order, timing and differential in which the two rail voltages are powered up and down. Ignoring proper sequencing may result in two types of failures. The first type of failure represents a threat to the long-term reliability of the dual voltage device. However, the second failure results in a more immediate threat with a possibility of damaging interface circuits in the processor or system devices such as memory, logic, or data converter ICs.

The long-term reliability of a dual voltage device maybe compromised from stress placed on internal circuits that connect portions of a chip powered by separate power rails. This type of stress is considered low level and occurs when one rail is active while the other rail is inactive. Typically, no permanent damage or reliability problems occur unless the condition persists over extended periods of time. However, cumulative exposure to uncontrolled power up and power down cycles can compromise the reliability of dual voltage devices in systems that are cycled on and off many times a day.

However, the reliability problem with interface circuitry can be immediate and catastrophic. Latch-up may occur when a processors, I/O interface and the I/O interface of a supporting peripheral such as memory, FPGA, or data converter are typically not powered from the same supply. Latch-up occurs when the current is forced through the substrate of a CMOS device and triggers a self-sustained conduction path in back to parasitic bipolar transistors. These parasitic transistors are unavoidable in most CMOS applications and form a structure similar to a SCR, connected between the power supply and ground. Once triggered, current continues to flow until the current is interrupted. The trigger current may occur if power is applied unevenly to the interfaces on the shared I/O bus. Yet another potential problem with improper supply sequencing is bus contention. Bus contention can occur when the processor and another device both attempt to control a bi-direction bus during power up.

To avoid these problems with the processor and system ICs, there are three general techniques for power up sequencing two or more power rails namely, sequential, ratiometric, or simultaneous. Sequential power up, as the name implies, powers up the two rails one after another. Typically, the second rail begins to ramp up once the first rail reaches regulation. Alternatively, the second rail may begin to ramp up after a set delay from the start of the first rail.

With the second or ratiometric method, the two rails begin to power up and reach regulation at the same time. This requires a higher slew rate for the rail with the higher final voltage, and results in the maximum voltage differential occurring when regulation is reached. However, some processors may not tolerate the instantaneous voltage differences that occur before regulation is reached, or the processor may draw high current from one supply during this period.

The third approach namely simultaneous eliminates instantaneous voltage differences and minimizes the magnitude and duration of stress. In this method, the voltage rails rise together and at the same rate with the higher or I/O voltage rail continuing after the lower or core voltage rail has reached its final value. One problem with simultaneous startup is the high current that results from the initialized logic within the DSP.

Thus, it is desirable to have a circuit to control two or more regulators to achieve simultaneous sequencing and satisfy the power requirements dual power logic devices.

SUMMARY OF THE INVENTION

The present invention controls two or more regulators by providing the feedback output of one regulator to control the output of the remaining regulators. Thus, an adaptive sample gain feedback scheme is achieved. The first regulator and second regulator start to increase the output voltage until the first regulator has reached a predetermined voltage. The second regulator's voltage does not continue to rise at the same rate. After the first regulator reaches the predetermined voltage, the second regulator is allowed to continue at a rate of rise that is determined by an R-C network.

DETAILED DESCRIPTION OF THE DRAWINGS

The present invention is an apparatus and method for controlling regulators. The regulator may be a DC to DC regulator. However, the regulator may be any switching regulator, for example single ended inductor circuit, diode-capacitor circuit, or transform-coupled circuit. Series regulators may also be employed for a regulator.

Figure 1:
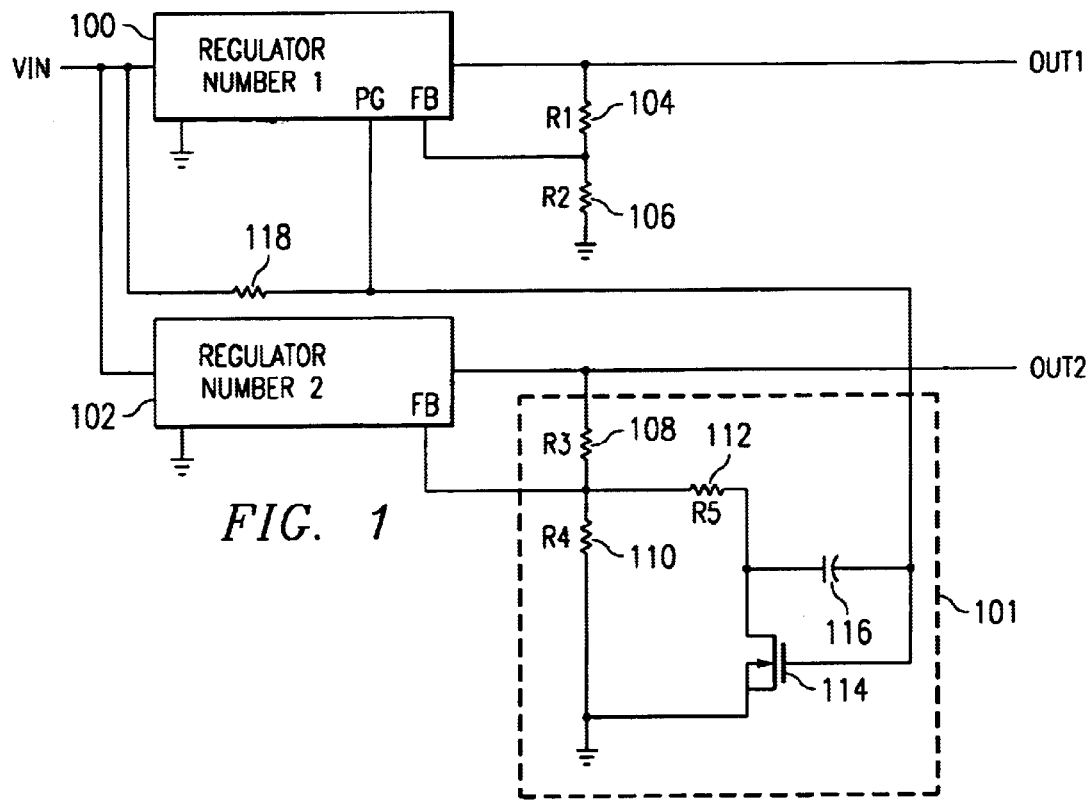
FIG. 1 illustrates a circuit diagram of the present invention.

FIG. 1 illustrates a first regulator 100 to generate a first supply voltage and second regulator 102 to generate a second supply voltage. Additional regulators of the same or different types may be employed. The first regulator 100 includes a power good function illustrated as an output port of first regulator 100. This is an open drain output that is asserted low when the voltage output on the feedback input is less than 90% of the internal reference voltage. The power good output transitions to high impedance when the output voltage is greater than 93% of the internal reference voltage. The voltage output is fed back to the regulator by using the feedback input. The feedback input to first regulator 100 inputs the output voltage of the first regulator 100 or a portion of the output voltage as an indication that the output voltage is approaching the internal reference voltage. The internal reference voltage is a voltage to indicate the desired output voltage of the first regulator 100. When the output voltage of the first regulator 100 reaches the internal reference voltage, the first regulator 100 stops increasing the output voltage and maintains the output voltage. Typically, the output voltage of the second regulator 102 has not reached the desired level. A higher output voltage is usually desired for the second regulator 102.

It is further desirable to change the rate of increase (the slope) of the voltage output of the second regulator 102. The first regulator 100 has an output connected to resistor 104. The other end of resistor 104 is connected to resistor 106; the other end of resistor 104 is additionally connected to the feedback (FB) input of regulator 100. The other end of resistor 106 is connected to ground. The resistors 104 and 106 form a voltage dividing circuit to divide the output voltage of the first regulator 100 so that the feedback input of first regulator 100 receives a reduced voltage based on the ratio of the resistance of resistor 104 and 106. The input of the first regulator 100 and the second regulator 102 is connected to receive voltage $V_{IN}$. Additionally, the resistor 118 is connected to the input of first regulator 100 to receive the voltage $V_{IN}$.

The second regulator 102 has an output of second regulator 102 being connected to resistor 108; the other end of resistor 108 is connected to resistor 110, and the other end of resistor 110 is connected to ground. A feedback circuit 101 to control regulator 102 includes resistor 110, resistor 112, capacitor 116, switch 114, and resistor 108. The connection between resistor 108 and resistor 110 is connected to the feedback input of the second regulator 102. Resistor 108 and resistor 110 operate in a similar fashion with respect to the second regulator 102 as resistor 104 and resistor 106 operate with respect to the first regulator 100. Namely, resistor 108 and resistor 110 form a second voltage dividing circuit to produce a second reduced voltage with respect to the output voltage of the second regulator 102. The second reduced voltage is input to the feedback input. The other end of resistor 118 is connected to capacitor 116 and the gate of NFET 114 or switch 114. Switch 114 maybe a bipolar device. The drain of of NFET 114 is connected to resistor 112, and the other end of resistor 112 is connected to the connection point between resistor 108 and resistor 110. The drain is connected to the body of NFET 114 and additionally connected to the other end of resistor 110. The resistor 112 when connected to the resistor 104 through NFET 114 or switch 114 changes the resistance ratio of the voltage divider circuit.

When resistor 110 and resistor 112 are switched in parallel, the net result is a lower resistance than the resistance of resistor 110. This lower resistance causes the second regulator 102 to increase the output voltage. A capacitor 116 is connected between one end of resistor 112 and the other end of resistor 118. This capacitor 116 in combination with resistor 118 forms a voltage source with a RC time constant which slows down the rate of increase of the output of the second regulator 102. The capacitor 116 keeps the voltage at the connection point of resistor 108 and resistor 110 from increasing too fast until the capacitor has charged up. In operation, $V_{IN}$ is applied simultaneously to the first regulator 100 and the second regulator 102. The output of the first regulator 100 and the second regulator 102 essentially track each other for time period as shown by curve b in FIG. 5. The reduced voltage input to feedback input of the first regulator 100 is compared with an internal reference voltage, and when it is determined that the output voltage has reached its desired or predetermined value, at which time, the power good output is transitioned to a high impedance from a lower impedance and consequently, a voltage is applied to capacitor 116 and to the gate of NFET 114. The NFET 114 switches to conduct from drain to source, and resistor 112 is placed in parallel with resistor 110 changing the effective resistance of the voltage dividing circuit. This increases the voltage at the second regulator 102. The output voltage of regulator 102 rises slowly in accordance with the RC time constant of resistor 118 and capacitor 114. The capacitor 116 charges up in accordance to the time constant RC where C is the capacitance of capacitor 116 and R is the resistance of resistor 118. The output voltage of the second regulator 102 increases along curve C shown in FIG. 5 while the voltage output of first regulator 100 remains substantially the same. As a result of the capacitor 116 and the associated time constant RC, the second regulator 102 avoids the excessive current draw of the prior art devices. As a result of turning switch 114 on, resistor 110 is now in parallel with resistor 112 changing the sampling gain to a different value. The voltage output from the second regulator 102 continues to rise. The capacitor 116 precharges and puts a voltage on the node between resistor 108 and resistor 110, and this causes the second regulator 102 to momentarily regulate at a lower value as a result of the precharging.

Figure 2:
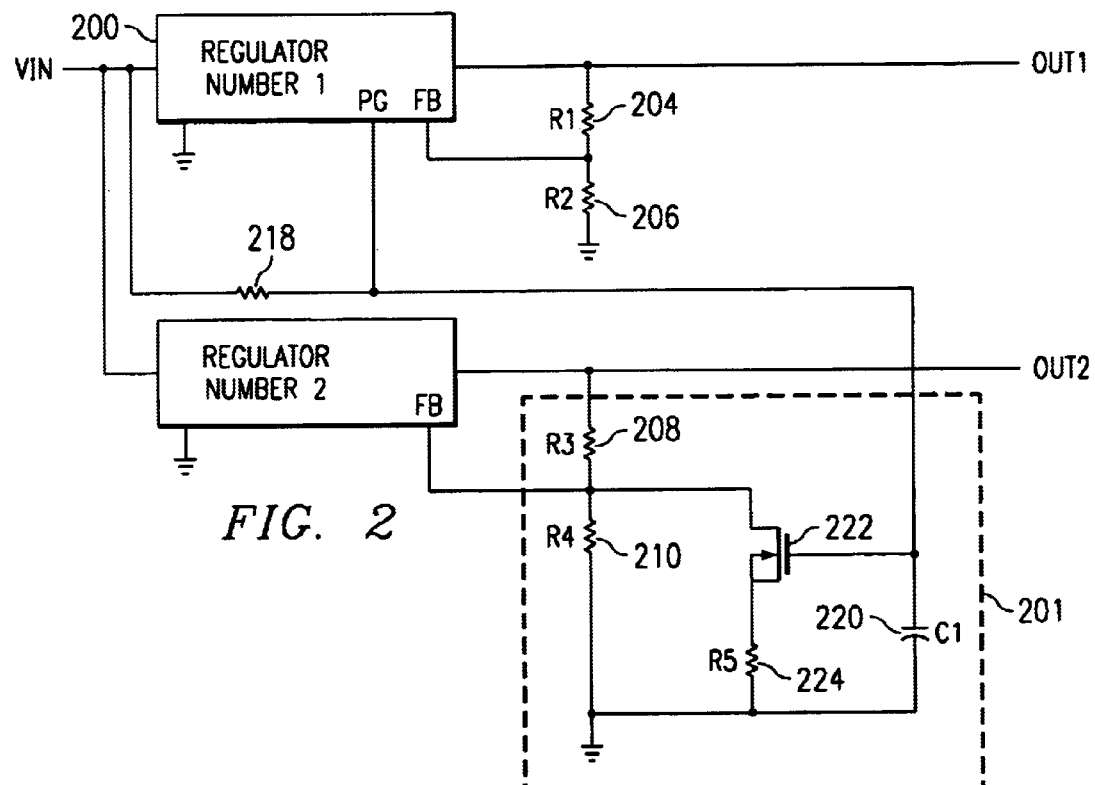
FIG. 2 illustrates a second circuit diagram of the present invention.

In FIG. 2, similar elements have been similarly numbered. The switch 222, resistor 224, and capacitor 220 of FIG. 2 have been arranged differently. The switch 220 is connected at its drain to the connection between resistor 208 and resistor 210. The source of switch 222 is connected to resistor 224 and the other side of resistor 224 is connected to ground. The capacitor 220 is connected to the drain of switch 222 to ground. This configuration prevents any glitches in the voltage input to the feedback input, which may occur with circuits in FIGS. 1 and 3.

Figure 3:
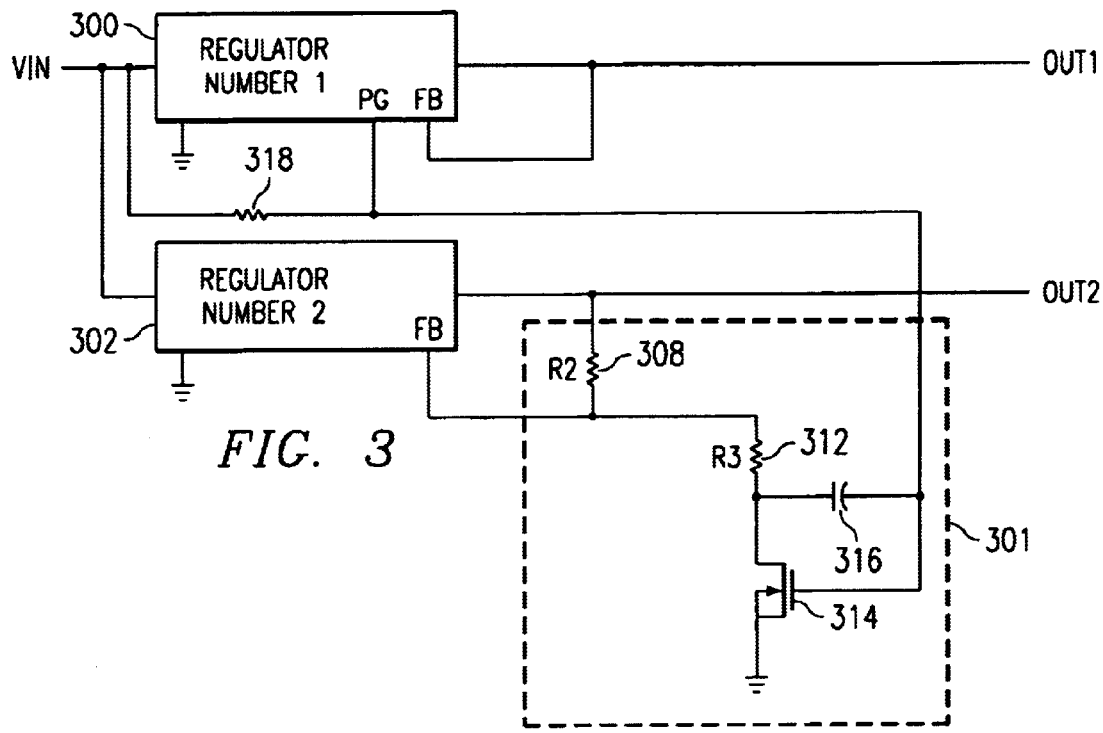
FIG. 3 illustrates a third circuit diagram of the present invention.

In FIG. 3, resistor 104 has been removed as well as resistor 106 (as shown in FIG. 1). The output voltage of the first regulator 300 is directly connected to the feedback input. Additionally, the resistor 110 (as shown in FIG. 1) has been removed. Resistor 312 is switched in and out of the feedback loop.

Figure 4:
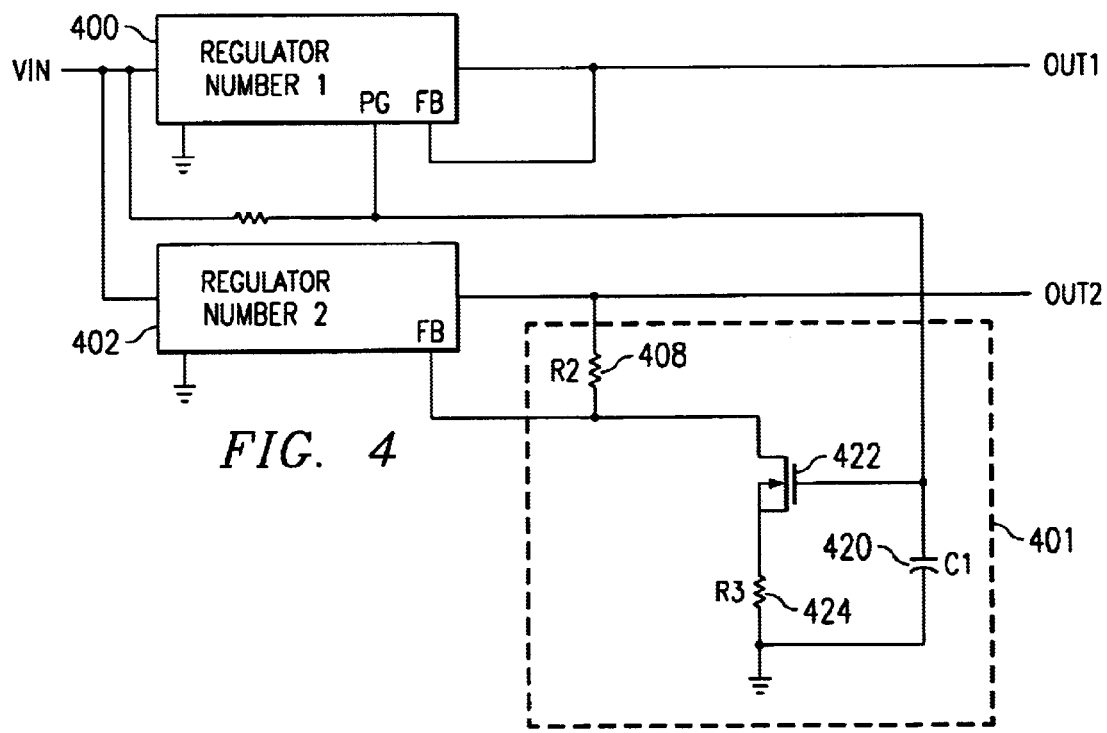
FIG. 4 illustrates a fourth circuit diagram of the present invention.

FIG. 4 has the same resistors removed as in FIG. 3 however, the switch 422, resistor 424, and capacitor 420 have the same configuration as shown in FIG. 2.

Figure 5:
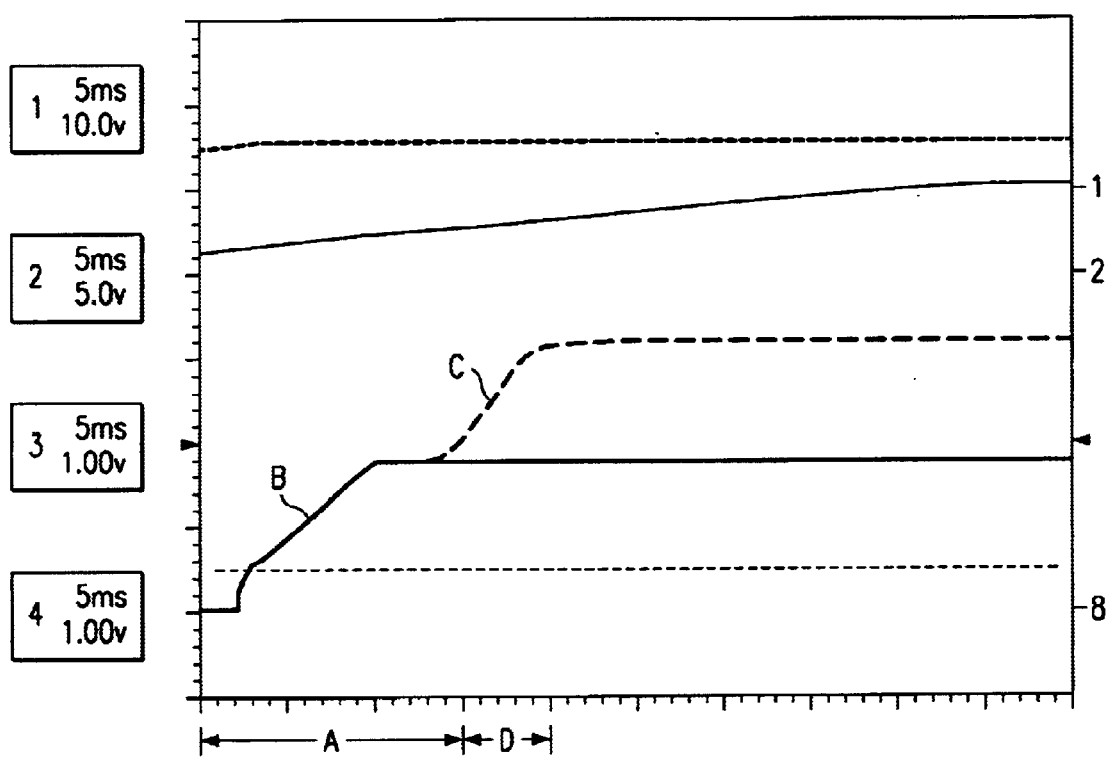
FIG. 5 illustrates a waveform diagram of the output of the circuits of the present invention.
Figure 6:
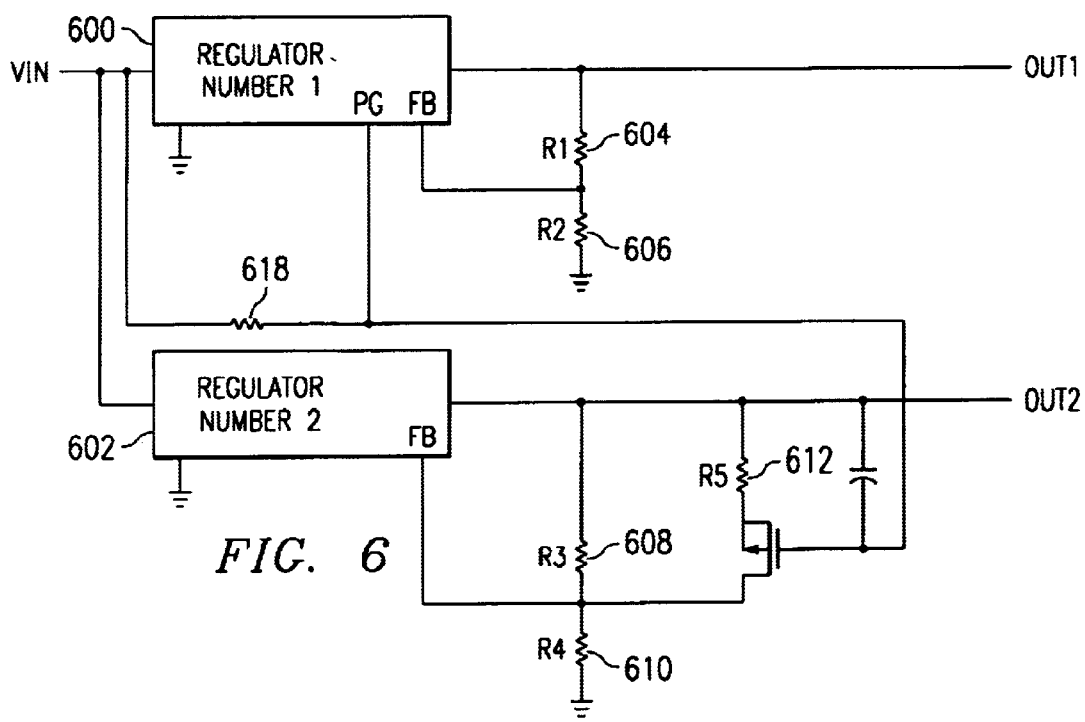
FIG. 6 illustrates a PMOS embodiment of the present invention.
Figure 7:
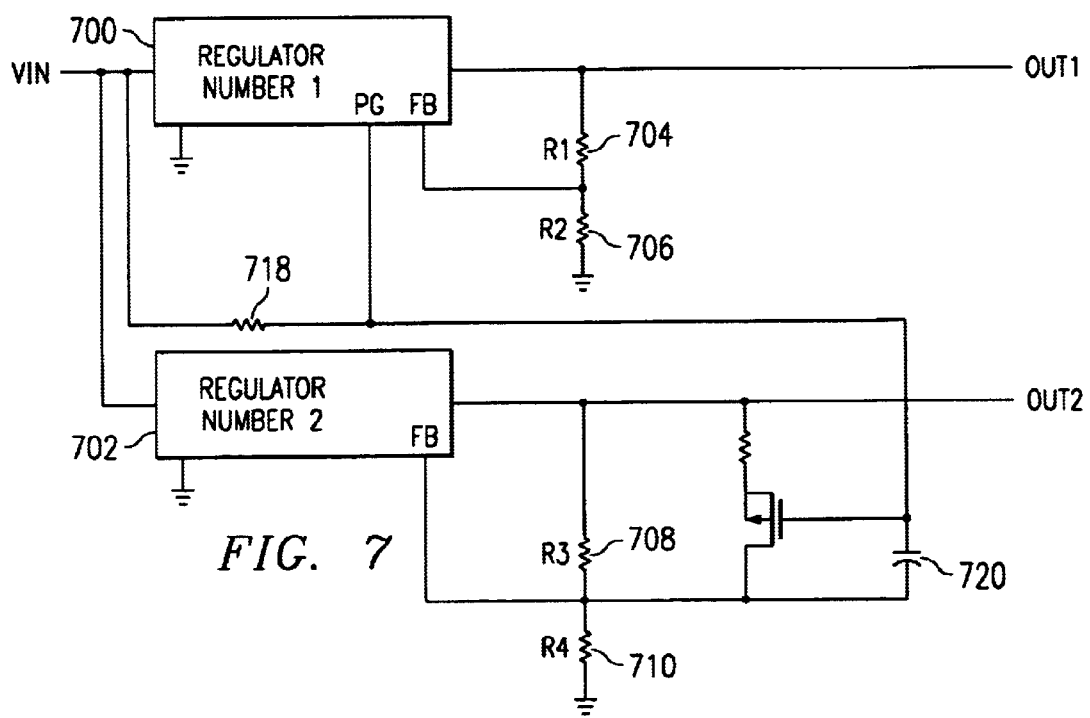
FIG. 7 illustrates another PMOS embodiment of the present invention.

FIGS. 5 and 6 illustrate the switching and capacitor configuration as shown in FIGS. 1–4 but using a PFET device instead of NFET.

The present invention can be used to power a DSP, FPGA or microprocessor.

What is claimed is:

1. An apparatus for generating a supply voltage; comprising:

a first independent regulator for generating a first supply voltage;

a second independent regulator for generating a second supply voltage independent from said first supply voltage; and a feedback circuit based on first regulator to control said second supply voltage of said second regulator.

2. An apparatus for generating a supply voltage; comprising:

a first regulator for generating a first supply voltage;

a second regulator for generating a second supply voltage; and a feedback circuit based on first regulator to control said second supply voltage of said second regulator wherein said feedback circuit includes a capacitor to reduce the second supply voltage.

3. An apparatus for generating a supply voltage as in claim 2, wherein said feedback circuit includes a switch to charge a resistor divider circuit.

4. An apparatus for generating a supply voltage as in claim 2, wherein said capacitor is charged after said first supply voltage has reached a predetermined voltage.

5. An apparatus for generating a supply voltage as in claim 2, wherein said first supply voltage is applied to a first device.

6. An apparatus for generating a supply voltage as in claim 5, wherein said second supply voltage is applied to a second device.

7. An apparatus for generating a supply voltage as in claim 5, wherein said first device is a DSP.

8. An apparatus for generating a supply voltage as in claim 6, wherein said second device is a DSP.

9. An apparatus for generating a supply voltage as in claim 3, wherein said switch is a silicon switch.

10. An apparatus for generating a supply voltage as in claim 9, wherein said silicon switch is a FET.

11. An apparatus for generating a supply voltage as in claim 2, wherein said feedback circuit includes a switch to start charging said capacitor.

* * * * *